(12) United States Patent
Wong et al.

(10) Patent No.: US 6,774,325 B1
(45) Date of Patent: Aug. 10, 2004

(54) REDUCING OXIDES ON A SWITCHING FLUID IN A FLUID-BASED SWITCH

(75) Inventors: Marvin Glenn Wong, Woodland Park, CO (US); John Ralph Lindsey, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/414,130

(22) Filed: Apr. 14, 2003

(51) Int. Cl.[7] .............................................. H01H 29/00
(52) U.S. Cl. ..................................................... 200/182
(58) Field of Search ........................ 200/182, 187–189, 200/209–219, 233–236; 310/328, 331, 348, 363; 335/4, 47, 78; 385/19

(56) References Cited

U.S. PATENT DOCUMENTS

| | | | |
|---|---|---|---|
| 2,312,672 A | 3/1943 | Pollard, Jr. | |
| 2,564,081 A | 8/1951 | Schilling | |
| 3,430,020 A | 2/1969 | Tomkewitsch et al. | |
| 3,529,268 A | 9/1970 | Rauterberg | |
| 3,600,537 A | 8/1971 | Twyford | |
| 3,639,165 A | 2/1972 | Rairden, III | |
| 3,657,647 A | 4/1972 | Beusman et al. | |
| 3,955,059 A | * 5/1976 | Graf ........................... | 200/181 |

(List continued on next page.)

FOREIGN PATENT DOCUMENTS

| | | |
|---|---|---|
| EP | 0593836 A1 | 4/1994 |
| FR | 2418539 | 9/1979 |
| FR | 2458138 | 12/1980 |
| FR | 2667396 | 4/1992 |
| JP | 36-18575 | 10/1961 |
| JP | 47-21645 | 10/1972 |
| JP | 62-276838 | 12/1987 |
| JP | 63-294317 | 12/1988 |
| JP | 8-125487 | 5/1996 |
| JP | 9-161640 | 6/1997 |
| WO | WO99-46624 | 9/1999 |

OTHER PUBLICATIONS

Marvin Glenn Wong, U.S. Patent application Ser. No. 10/137,691 (pending), "A Piezoelectrically Actuated Liquid Metal Switch", May 2, 2002.

J. Simon, et al., "A Liquid–Filled Microrelay with a Moving Mercury Microdrop", Journal of Microelectromechanical Systems, vol. 6, No. 3, Sep. 1997, pp. 208–216.

Marvin Glenn Wong, et al., New U.S. Patent Application (11 pages specification, 6 pages of claims, 1 page abstract, and 6 sheets of drawings), "Reducing Oxides on a Switching Fluid in a Fluid–Based Switch", Filed Apr. 14, 2003.

TDB–ACC–NO: NB8406827, "Integral Power Resistors For Aluminum Substrate", IBM Technical Disclosure Bulletin, Jun. 1984, US, vol. 27, Issue No. 1B, p. 827.

Bhedwar, Homi C., et al. "Ceramic Multilayer Package Fabrication", Electronic Materials Handbook, Nov. 1989, pp 460–469, vol. 1 Packaging, Section 4: Packages.

Kim, Joonwon, et al., "A Micromechanical Switch With Electrostatically Driven Liquid–Metal Droplet", Sensors And Actuators, A; Physical v 9798, Apr. 1, 2002, 4 pages.

*Primary Examiner*—Michael A. Friedhofer

(57) ABSTRACT

A fluid-based switch and method for producing the same are disclosed. In one embodiment, the switch is produced by depositing switching fluid on a first substrate; depositing a reducing material so that the reducing material contacts at least a portion of the switching fluid, the reducing material to react with oxides on the switching fluid, and mating a first substrate to a second substrate, the first substrate and the second substrate defining therebetween a cavity holding the switching fluid, the cavity being sized to allow movement of the switching fluid between first and second states.

29 Claims, 5 Drawing Sheets

U.S. PATENT DOCUMENTS

| | | | |
|---|---|---|---|
| 4,103,135 A | 7/1978 | Gomez et al. | |
| 4,200,779 A | 4/1980 | Zakurdaev et al. | |
| 4,238,748 A | 12/1980 | Goullin et al. | |
| 4,245,886 A | 1/1981 | Kolodzey et al. | |
| 4,336,570 A | 6/1982 | Brower et al. | |
| 4,419,650 A | 12/1983 | John | |
| 4,434,337 A | 2/1984 | Becker | |
| 4,475,033 A | 10/1984 | Willemsen et al. | |
| 4,505,539 A | 3/1985 | Auracher et al. | |
| 4,582,391 A | 4/1986 | Legrand | |
| 4,628,161 A | 12/1986 | Thackrey | |
| 4,652,710 A | 3/1987 | Karnowsky et al. | |
| 4,657,339 A | 4/1987 | Fick | |
| 4,742,263 A | 5/1988 | Harnden, Jr. et al. | |
| 4,786,130 A | 11/1988 | Georgiou et al. | |
| 4,797,519 A | 1/1989 | Elenbaas | |
| 4,804,932 A | 2/1989 | Akanuma et al. | |
| 4,988,157 A | 1/1991 | Jackel et al. | |
| 5,278,012 A | 1/1994 | Yamanaka et al. | |
| 5,415,026 A | 5/1995 | Ford | |
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A | 10/1998 | Donald | |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 | 4/2001 | Donald | |
| 6,255,133 B1 | 7/2001 | Ormond et al. | |
| 6,278,541 B1 | 8/2001 | Baker | |
| 6,304,450 B1 | 10/2001 | Dibene, II et al. | |
| 6,320,994 B1 | 11/2001 | Donald et al. | |
| 6,323,447 B1 | 11/2001 | Kondoh et al. | |
| 6,351,579 B1 | 2/2002 | Early et al. | |
| 6,356,679 B1 | 3/2002 | Kapany | |
| 6,373,356 B1 | 4/2002 | Gutierrez et al. | |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 | 9/2002 | Tarazona | |
| 6,470,106 B2 | 10/2002 | McClelland et al. | |
| 6,487,333 B2 | 11/2002 | Fouquet et al. | |
| 6,501,354 B1 | 12/2002 | Gutierrez et al. | |
| 6,512,322 B1 | 1/2003 | Fong et al. | |
| 6,515,404 B1 | 2/2003 | Wong | |
| 6,516,504 B2 | 2/2003 | Schaper | |
| 6,559,420 B1 | 5/2003 | Zarev | |
| 6,633,213 B1 | 10/2003 | Dove | |
| 6,646,527 B1 * | 11/2003 | Dove et al. | 335/47 |
| 6,647,165 B2 * | 11/2003 | Hu et al. | 385/16 |
| 2002/0037128 A1 | 3/2002 | Burger et al. | |
| 2002/0146197 A1 | 10/2002 | Yong | |
| 2002/0150323 A1 | 10/2002 | Nishida et al. | |
| 2002/0168133 A1 | 11/2002 | Takeshi et al. | |
| 2003/0035611 A1 | 2/2003 | Shi | |

* cited by examiner

REDUCING OXIDES ON A SWITCHING FLUID IN A FLUID-BASED SWITCH

BACKGROUND OF THE INVENTION

Liquid metal micro switches (LIMMS) have been made that use a liquid metal, such as mercury, as the switching fluid. The liquid metal may make and break electrical contacts. To change the state of the switch, a force is applied to the switching fluid, which causes it to change form and move. The liquid metal may form oxide films that inhibit proper functioning of the switch. For example, the oxide film may increase the surface tension of the liquid metal, which may increase the energy required for the switch to change state.

SUMMARY OF THE INVENTION

In one embodiment, a method for reducing oxides on switching fluid is disclosed. The method includes depositing a switching fluid on a first substrate. A solid reducing material is deposited so that it contacts at least a portion of the switching fluid. The reducing material reacts with oxides on the switching fluid. Finally, the first substrate is mated to a second substrate, the first substrate and the second substrate defining therebetween a cavity holding the switching fluid, the cavity being sized to allow movement of the switching fluid between first and second states.

In another embodiment, the method comprises depositing a switching fluid on a first substrate. The switching fluid is mixed with a reducing material to react with oxides on the switching fluid. The first substrate is mated to a second substrate, the first substrate and the second substrate defining therebetween a cavity holding the switching fluid, the cavity being sized to allow movement of the switching fluid between first and second states.

In a third embodiment, the method comprises depositing a switching fluid in a switching fluid channel. An actuating fluid mixed with reducing material is deposited on a first substrate. The reducing material contacts the switching fluid during switch state changes and reduces oxides on the switching fluid. The first substrate and a second substrate are then mated together, the substrates defining between them a cavity holding the switching fluid and one or more additional cavities, connected to the switching fluid cavity, that hold the actuating fluid mixed with the reducing material.

BRIEF DESCRIPTION OF THE DRAWINGS

Illustrative embodiments of the invention are illustrated in the drawings in which.

DETAILED DESCRIPTION

Figure 1:
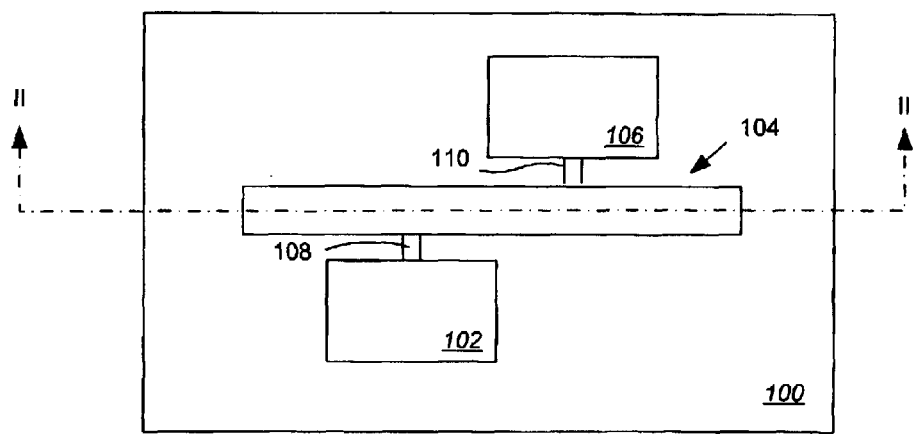
FIG. 1 illustrates a plan view of a first exemplary embodiment of a fluid-based switch.
Figure 2:
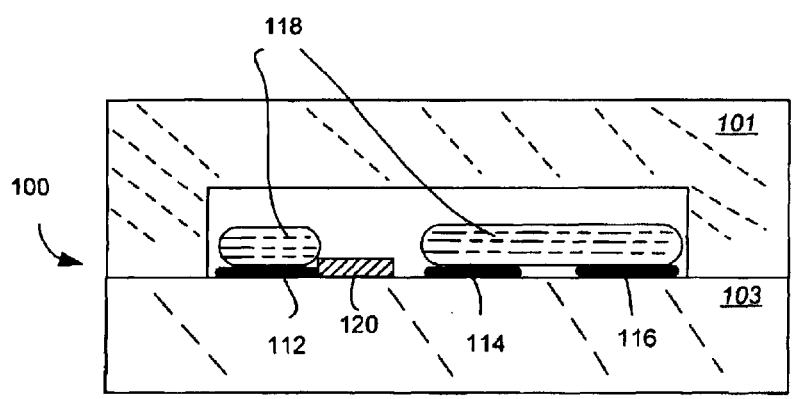
FIG. 2 illustrates an elevation of the switch shown in FIG. 1.

FIGS. 1 and 2 illustrate a fluid-based switch such as a LIMMS. The switch 100 includes a switching fluid cavity 104, a pair of actuating fluid cavities 102, 106, and a pair of cavities 108, 110 that connect corresponding ones of the actuating fluid cavities 102, 106 to the switching fluid cavity 104. It is envisioned that more or fewer cavities may be formed in the switch. For example, the pair of actuating fluid cavities 102, 106 and pair of connecting cavities 108, 110 may be replaced by a single actuating fluid cavity and single connecting cavity.

Figure 3:
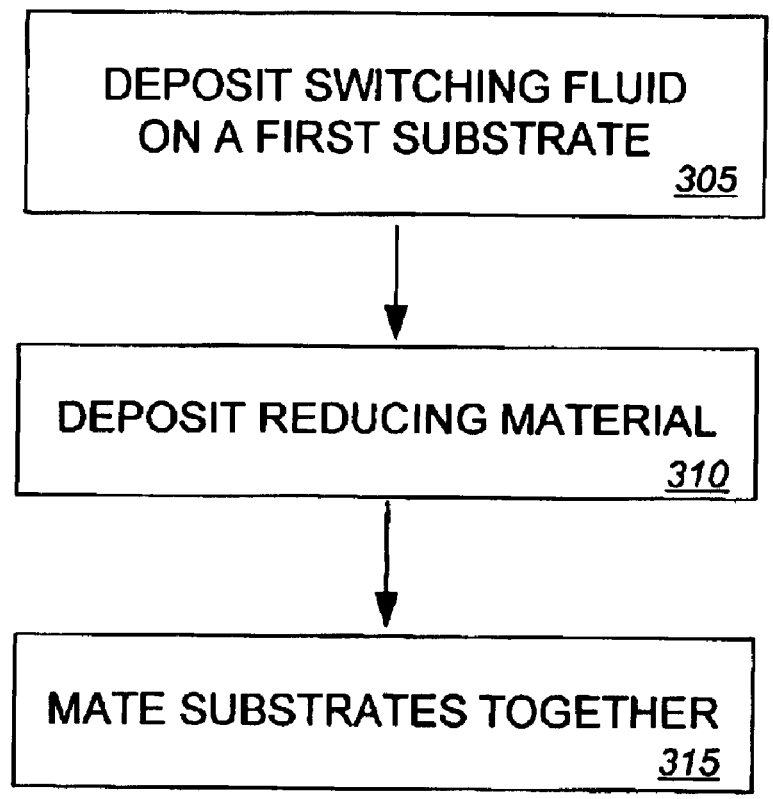
FIG. 3 illustrates an exemplary method that may be used to produce the fluid-bases switch of FIGS. 1 and 2.

As illustrated by FIG. 3, the switch 100 may be produced by depositing 305 a switching fluid 118 on a plurality of switch contacts (e.g., electrodes) 112–116 on a first substrate 101. In one embodiment, the switching fluid may be a liquid metal, such as mercury or alloys that contain gallium. As will be described in further detail below, the switching fluid 118 may be used to make and break contact between the contacts 112, 114, 116. In an alternate embodiment, the switching fluid may be deposited on a plurality of wettable pads and may be used to open and block light paths. Although the switch illustrated in FIG. 1 includes three contacts, it should be appreciated that alternate embodiments may have a different number of contacts.

Next, a reducing material 120 is deposited 310 in a location so that it will contact at least a portion of the switching fluid 118 during switch state changes. The reducing material 120 may be a material that has a lower negative reduction potential than the switching fluid 118 that is used to react with oxides that form on the switching fluid 118. By way of example, when mercury is used as the switching fluid, the reducing material may be a solid layer of carbon, chromium, magnesium, aluminum, titanium, manganese, nickel, silicon or other suitable material.

The substrates 101, 103 are mated together 315. A cavity holding the switching fluid 118 is defined between the substrates. The cavity is sized to allow movement of the switching fluid between first and second states. If the temperature is high enough within the cavity holding the switching fluid or catalysts are present, the reaction between the reducing material and oxides on the switching fluid can proceed when the reducing material contacts the switching fluid.

Figure 4:
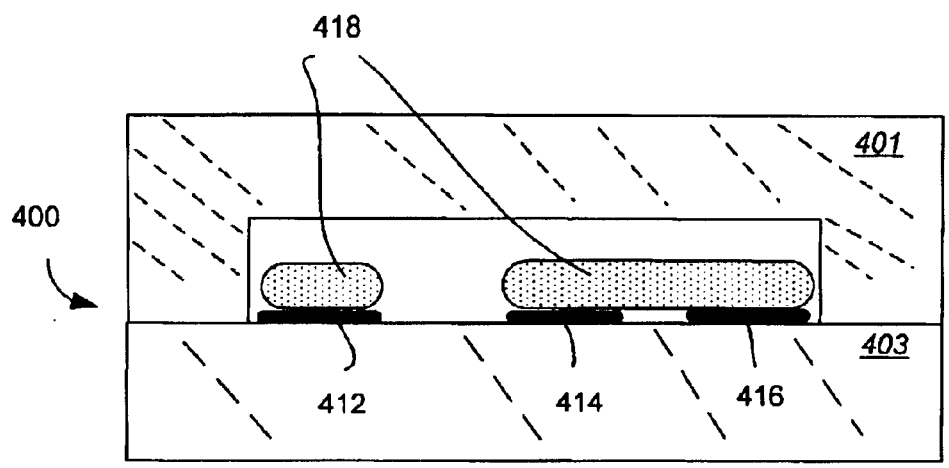
FIG. 4 illustrates an elevation of a second exemplary embodiment of a fluid-based switch.
Figure 5:
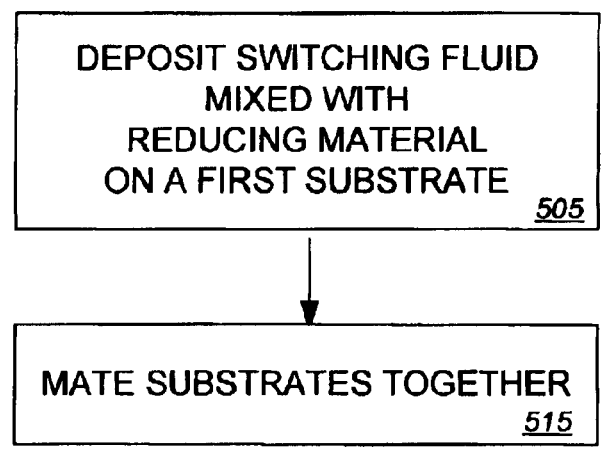
FIG. 5 illustrates an exemplary method that may be used to produce the fluid-based switch of FIG. 4.

FIG. 4 illustrates an alternate embodiment of a switch including reducing material to reduce oxides on switching fluid. As illustrated by FIG. 5, the switch 400 can be produced by depositing 505 switching fluid mixed with reducing material 418 on a plurality of contacts 412, 414, 416 located on a first substrate 401. In an alternate embodiment, switching fluid mixed with reducing material 418 may be deposited on wettable pads or liquid electrodes. Substrates 401 and 403 are mated together 515 so that a switching fluid cavity is defined between the substrates.

The reducing material may be particles or powder deposited on or mixed with the switching fluid. This may increase the surface area of the reducing material and allow less material to reduce larger amounts of switching fluid oxides. By way of example, the switching fluid may be a liquid metal, such as mercury, and the reducing material may be carbon, chromium, magnesium, aluminum, titanium, manganese, nickel, or silicon. Other suitable reducing materials may also be used. As the switch changes state, the switching fluid may be mixed allowing the reducing material to contact and react with any oxides that may have formed on the switching fluid.

Figure 6:
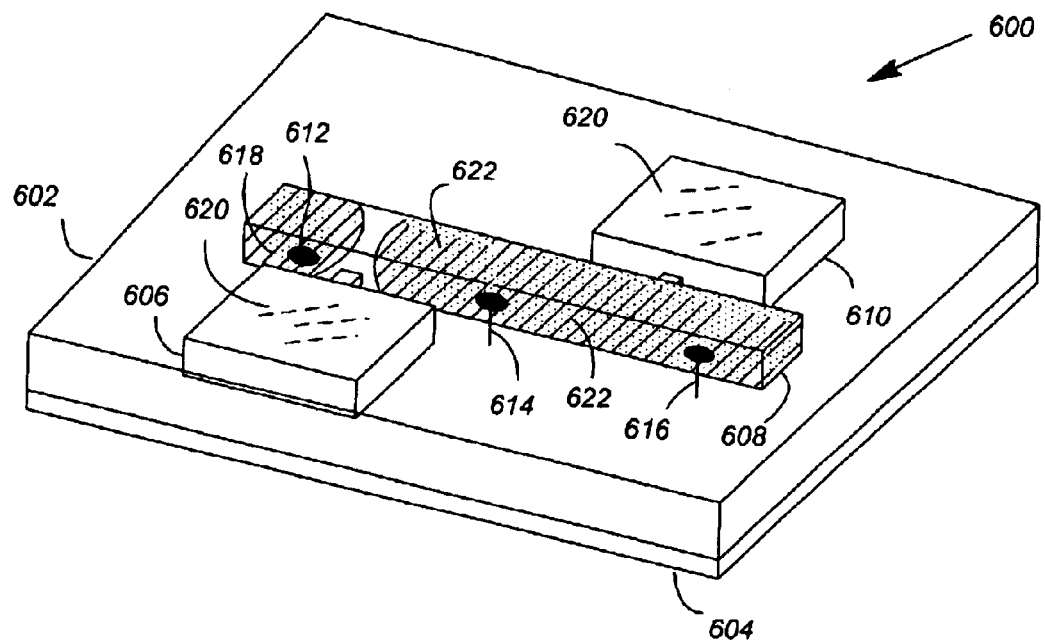
FIG. 6 illustrates a perspective view of a first exemplary embodiment of a switch including reducing material to react with oxides on switching fluid.

The functioning of a switch according to one embodiment can be explained with reference to FIG. 6. The switch 600 comprises a first substrate 602 and a second substrate 604 mated together. The substrates 602 and 604 define between them a number of cavities 606, 608, and 610. Exposed within one or more of the cavities are a plurality of electrodes 612, 614, 616. A switching fluid 618 (e.g., a conductive liquid metal such as mercury) held within one or more of the cavities serves to open and close at least a pair of the plurality of electrodes 612–616 in response to forces that are applied to the switching fluid 618. An actuating fluid 620 (e.g., an inert gas or liquid) held within one or more of the cavities serves to apply the forces to the switching fluid 618.

In one embodiment of the switch 600, the forces applied to the switching fluid 618 result from pressure changes in the actuating fluid 620. The pressure changes in the actuating fluid 620 impart pressure changes to the switching fluid 618, and thereby cause the switching fluid 618 to change form, move, part, etc. In FIG. 6, the pressure of the actuating fluid 620 held in cavity 606 applies a force to part the switching fluid 618 as illustrated. In this state, the rightmost pair of electrodes 614, 616 of the switch 600 are coupled to one another. If the pressure of the actuating fluid 620 held in cavity 606 is relieved, and the pressure of the actuating fluid 620 held in cavity 610 is increased, the switching fluid 618 can be forced to part and merge so that electrodes 614 and 616 are decoupled and electrodes 612 and 614 are coupled.

By way of example, pressure changes in the actuating fluid 620 may be achieved by means of heating the actuating fluid 620, or by means of piezoelectric pumping. The former is described in U.S. Pat. No. 6,323,447 of Kondoh et al. entitled "Electrical Contact Breaker Switch, Integrated Electrical Contact Breaker Switch, and Electrical Contact Switching Method", which is hereby incorporated by reference for all that it discloses. The latter is described in U.S. patent application Ser. No. 10/137,691 of Marvin Glenn Wong filed May 2, 2002 and entitled "A Piezoelectrically Actuated Liquid Metal Switch", which is also incorporated by reference for all that it discloses. Although the above referenced patent and patent application disclose the movement of a switching fluid by means of dual push/pull actuating fluid cavities, a single push/pull actuating fluid cavity might suffice if significant enough push/pull pressure changes could be imparted to a switching fluid from such a cavity. Additional details concerning the construction and operation of a switch such as that which is illustrated in FIG. 6 may be found in the aforementioned patent of Kondoh.

Switch 600 further includes reducing material 622 mixed with switching fluid 618. Reducing material 622 may have a lower negative reduction potential than switching fluid 618. If the temperature is high enough or catalysts are present, the reducing material may react with oxides and reduce the oxides on the switching fluid 418. For example, if the switching fluid is mercury, the reducing material 622 may be carbon, chromium, magnesium, aluminum, titanium, manganese, nickel, silicon or other suitable material. In alternate embodiments, reducing material 618 may be a solid material deposited on one of the substrates.

A second exemplary embodiment of the functioning of a switch 700 will now be described with reference to FIG. 7. The switch 700 comprises a substrate 702 and a second substrate 704 mated together. The substrates 702 and 704 define between them a number of cavities 706, 708, 710. Exposed within one or more of the cavities are a plurality of wettable pads 712–716. A switching fluid 718 (e.g., a liquid metal such as mercury) is wettable to the pads 712–716 and is held within one or more of the cavities. The switching fluid 718 serves to open and block light paths 722/724, 726/728 through one or more of the cavities, in response to forces that are applied to the switching fluid 718. By way of example, the light paths may be defined by waveguides 722–728 that are aligned with translucent windows in the cavity 708 holding the switching fluid. Blocking of the light paths 722/724, 726/728 may be achieved by virtue of the switching fluid 718 being opaque. An actuating fluid 720 (e.g., an inert gas or liquid) held within one or more of the cavities serves to apply the forces to the switching fluid 718.

Switch 700 additionally includes reducing material 730 mixed with switching fluid 618. Reducing material 730 may have a lower negative reduction potential than switching fluid 718 and may be used to react with oxides that may form on switching fluid 718. For example, if the switching fluid is mercury, the reducing material 730 may be carbon, chromium, magnesium, aluminum, titanium, manganese, nickel, silicon or other suitable material. In alternate embodiments, reducing material 730 may be a solid material deposited on one of the substrates.

Figure 8:
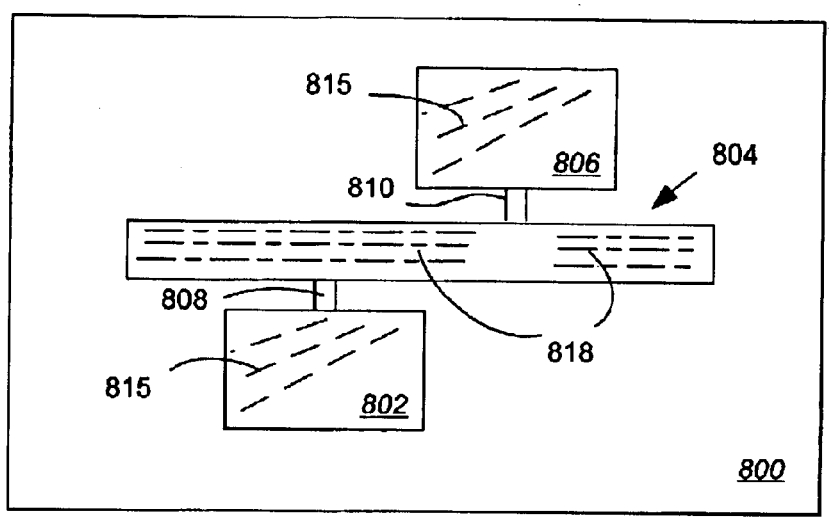
FIG. 8 illustrates a plan view of another embodiment of a switch including reducing material.

FIG. 8 illustrates another embodiment of a fluid-based switch having reducing material. The switch 800 includes a switching fluid cavity 804 holding switching fluid 818, a pair of actuating fluid cavities 802, 806, and a pair of cavities 808, 810 that connect corresponding ones of the actuating fluid cavities 802, 806 to the switching fluid cavity 804. It is envisioned that more or fewer cavities may be formed in the switch. For example, the pair of actuating fluid cavities 802, 806 and pair of connecting cavities 808, 810 may be replaced by a single actuating fluid cavity and single connecting cavity.

Actuating fluid cavities 802, 806 hold reducing material dissolved or mixed with actuating fluid 815. By way of example, the actuating fluid may be a perfluorocarbon oil (e.g., 3M Fluorinert™), and the reducing material may be a soluble material, such as aluminum hydride or sodium borohydride. As described elsewhere in this application, the actuating fluid applies forces to the switching fluid 818 to cause the switch 800 to change state. As the switch changes state, the actuating fluid mixed with reducing material 815 contacts switching fluid. The reducing material may then react with oxides on the switching fluid.

Figure 9:
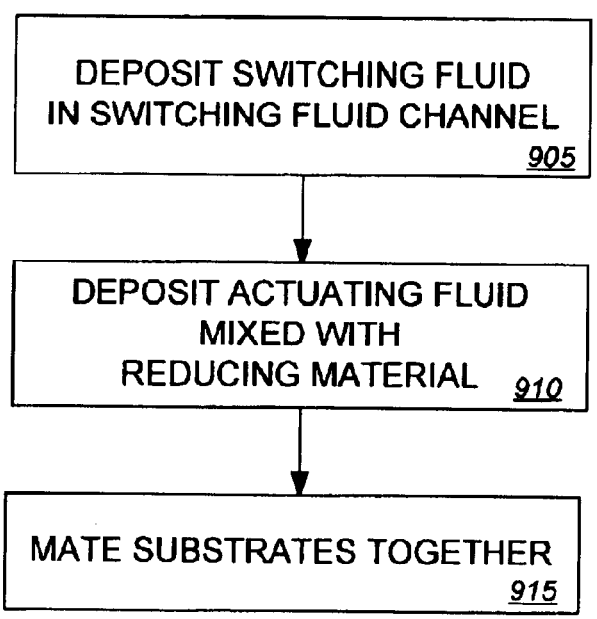
FIG. 9 illustrates an exemplary method that may be used to produce the switch of FIG. 8.

As illustrated by FIG. 9, the switch 800 may be produced by depositing 905 a switching fluid 818 in a switching fluid channel. Switching fluid may be deposited on a plurality of switch contacts (e.g., electrodes, or wettable pads) located in the switching fluid channel. The switching fluid channel may be located on either substrate mated together to form the switch. An actuating fluid mixed with reducing material 815 is also deposited 910 on one of the substrates. Next, the first substrate is mated to the second substrate so that a cavity 804 holding the switching fluid 818 is defined between the substrates. The cavity 804 is sized to allow movement of the switching fluid between first and second states. One or more additional cavities 802, 806 holding the actuating fluid mixed with reducing material 815 are also defined between the substrates. As the actuating fluid mixed with reducing material 815 applies force to the switching fluid 818 during switch state changes, the reducing material may reduce oxides on the switching fluid by reacting with the oxides.

Figure 7:
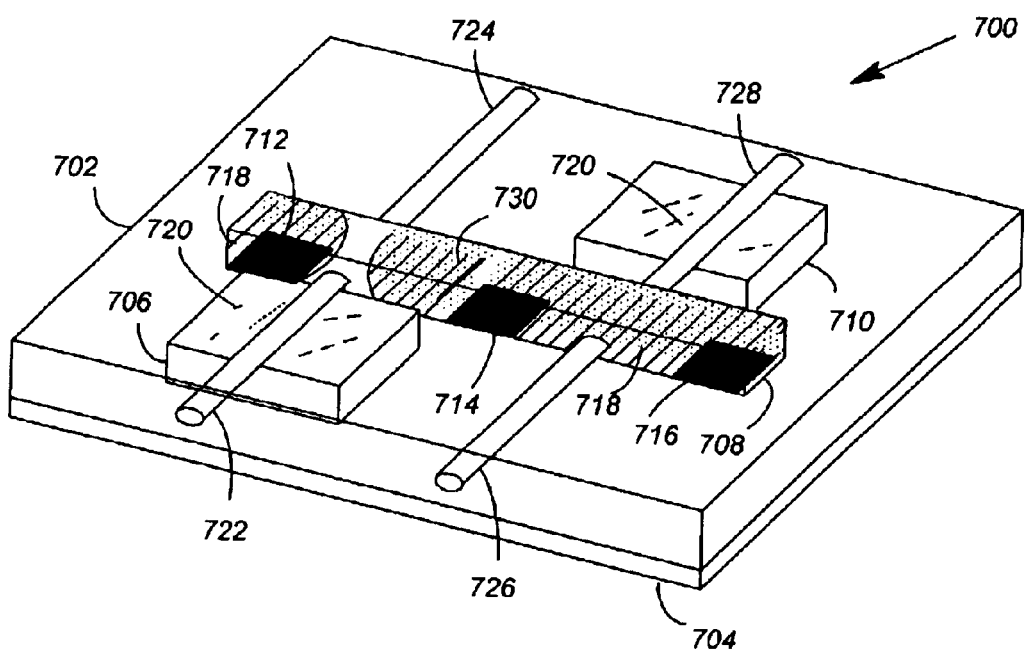
FIG. 7 illustrates a perspective view of a second exemplary embodiment of a switch including reducing material to react with oxides on switching fluid.

Additional details concerning the construction and operation of a switch such as that which is illustrated in FIG. 7 may be found in the aforementioned patent of Kondoh et al., and patent application of Marvin Wong.

While illustrative and presently preferred embodiments of the invention have been described in detail herein, it is to be understood that the inventive concepts may be otherwise variously embodied and employed. The appended claims are intended to be construed to include such variations, except as limited by the prior art.

What is claimed is:

1. A switch comprising:
   first and second mated substrates defining therebetween at least portions of a number of cavities;
   a plurality of electrodes exposed within one or more of the cavities;
   a switching fluid, held within one or more of the cavities, that serves to open and close at least a pair of the plurality of electrodes in response to forces that are applied to the switching fluid;
   a reducing material contacting at least a portion of the switching fluid, the reducing material to react with oxides on the switching fluid; and
   an actuating fluid, held within one or more of the cavities, that applies the forces to said switching fluid.

2. The switch of claim 1, wherein the reducing material comprises particles of material mixed with at least a portion of the switching fluid.

3. The switch of claim 1, wherein the reducing material comprises powder mixed with at least a portion of the switching fluid.

4. The switch of claim 1, wherein the reducing material comprises one of carbon, chromium, magnesium, aluminum, titanium, manganese, nickel, and silicon.

5. The switch of claim 1, wherein the switching fluid comprises mercury.

6. The switch of claim 1, wherein the reducing material comprises a solid material deposited on one of the substrates.

7. A switch comprising:
   first and second mated substrates defining therebetween at least portions of a number of cavities;
   a plurality of wettable pads exposed within one or more of the cavities;
   a switching fluid, wettable to said pads and held within one or more of the cavities, that serves to open and block light paths through one or more of the cavities in response to forces that are applied to the switching fluid;
   a reducing material contacting at least a portion of the switching fluid, the reducing material to react with oxides on the switching fluid; and
   an actuating fluid, held within one or more of the cavities, that applies the forces to said switching fluid.

8. The switch of claim 7, wherein the reducing material comprises particles of material mixed with at least a portion of the switching fluid.

9. The switch of claim 7, wherein the reducing material comprises powder mixed with at least a portion of the switching fluid.

10. The switch of claim 7, wherein the reducing material comprises one of carbon, chromium, magnesium, aluminum, titanium, manganese, nickel, and silicon.

11. The switch of claim 7, wherein the reducing material comprises a solid material deposited on one of the substrates.

12. A method comprising:
    depositing a switching fluid on a first substrate;
    depositing a solid reducing material so that the reducing material contacts at least a portion of the switching fluid, the reducing material to react with oxides on the switching fluid; and
    mating a first substrate to a second substrate, the first substrate and the second substrate defining therebetween a cavity holding the switching fluid, the cavity being sized to allow movement of the switching fluid between first and second states.

13. The method of claim 12, wherein the solid reducing material comprises a material having a larger negative reduction potential than the switching fluid.

14. The method of claim 12, wherein the solid reducing material comprises at least one of carbon, chromium, magnesium, aluminum, titanium, manganese, nickel, and silicon.

15. A method comprising:
    depositing a switching fluid on a first substrate, the switching fluid mixed with a reducing material, the reducing material to react with oxides on the switching fluid; and
    mating a first substrate to a second substrate, the first substrate and the second substrate defining therebetween a cavity holding the switching fluid, the cavity being sized to allow movement of the switching fluid between first and second states with respect to the switch contacts.

16. The method of claim 15, wherein the reducing material comprises a material having a larger negative reduction potential than the switching fluid.

17. The method of claim 15, wherein the reducing material comprises at least one of carbon, chromium, magnesium, aluminum, titanium, manganese, nickel, and silicon.

18. The method of claim 15, wherein the reducing material comprises particles of material.

19. The method of claim 15, wherein the reducing material comprises powder.

20. A switch, comprising:
    first and second mated substrates defining therebetween at least portions of a number of cavities;
    a switching fluid, held within one or more of the cavities, that is movable between at least first and second switch states in response to forces that are applied to the switching fluid;
    an actuating fluid, held within one or more of the cavities, that applies the forces to said switching fluid; and
    a reducing material mixed with the actuating fluid, the reducing material to react with oxides on the switching fluid during switch state changes.

21. The switch of claim 20, wherein the reducing material comprises liquid.

22. The switch of claim 20, wherein the reducing material comprises lithium aluminum hydride.

23. The switch of claim 20, wherein the reducing material comprises sodium borohydride.

24. The switch of claim 20, wherein the actuating fluid comprises perfluorocarbon oil.

25. The switch of claim 24, wherein the perfluorocarbon oil comprises 3M Fluorinert™.

26. A method comprising:
    depositing a switching fluid in a switching fluid channel;
    depositing an actuating fluid mixed with reducing material on a first substrate, the reducing material to contact the switching fluid during switch state changes and to react with oxides on the switching fluid; and mating the first substrate to a second substrate, the first substrate and the second substrate defining therebetween a first cavity holding the switching fluid, the cavity being sized to allow movement of the switching fluid between first and second states, the first substrate and the second substrate further defining one or more additional cavities holding the actuating fluid mixed with reducing material, the one or more additional cavities connected with the first cavity.

27. The method of claim 26, wherein the reducing material comprises lithium aluminum hydride.

28. The method of claim 26, wherein the reducing material comprises sodium borohydride.

29. The method of claim 26, wherein the actuating fluid comprises 3M Fluorinert™.

* * * * *